G. T. BURRELL.
AUTOMOBILE GUARD.
APPLICATION FILED DEC. 2, 1915.
1,235,406. Patented May 8, 1917.
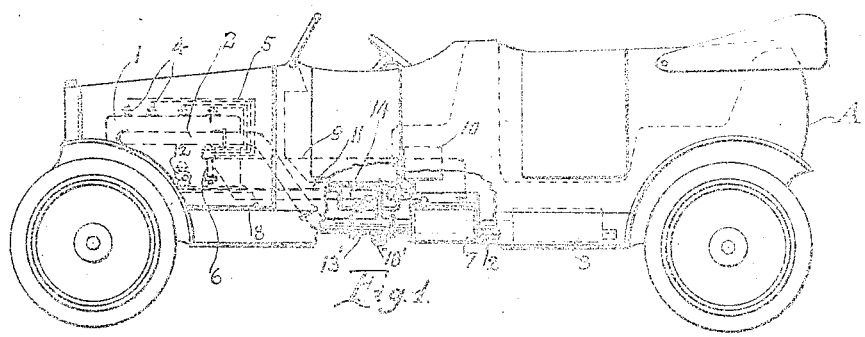
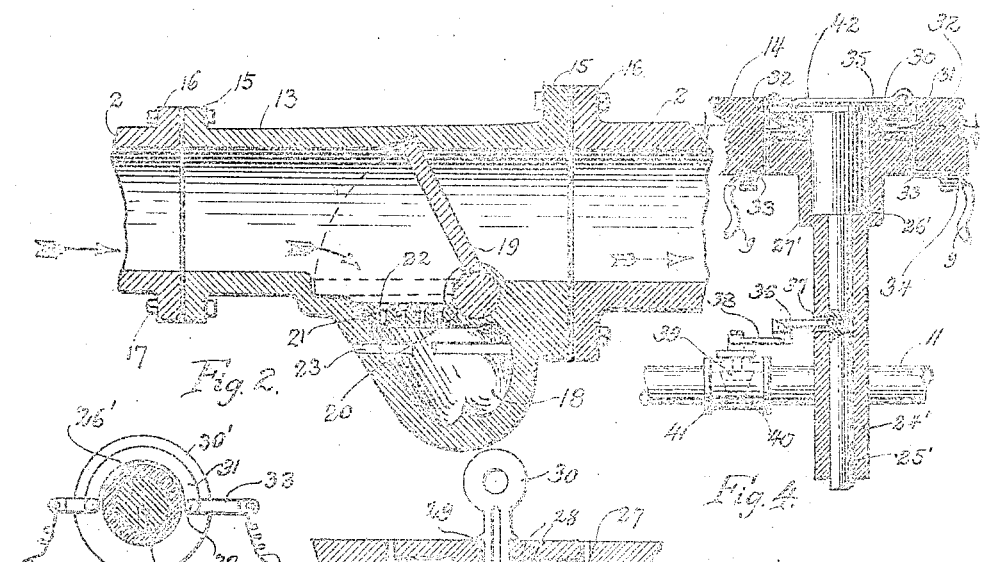
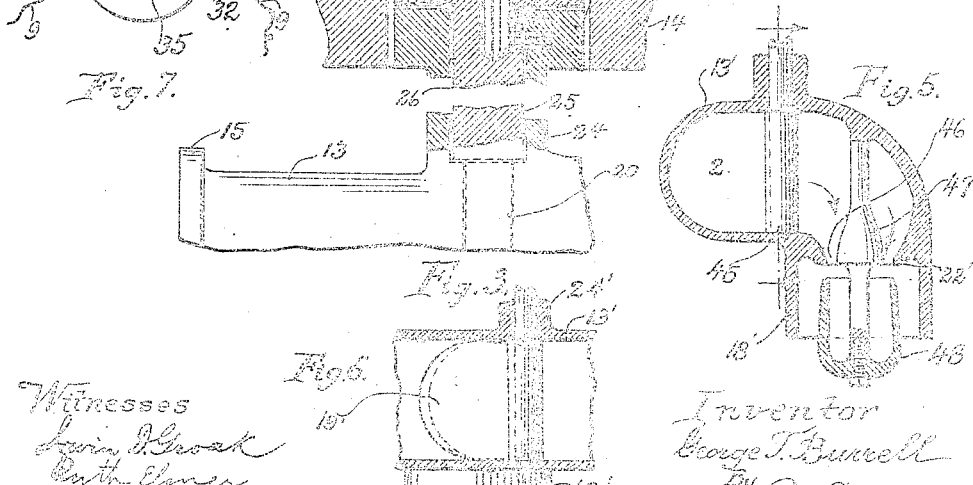

UNITED STATES PATENT OFFICE.

GEORGE T. BURRELL, OF RIVER FOREST, ILLINOIS.

AUTOMOBILE-GUARD.

1,225,406.

Specification of Letters Patent.

Patented May 8, 1917.

Application filed December 2, 1915. Serial No. 64,713.

*To all whom it may concern:*

Be it known that I, GEORGE T. BURRELL, a citizen of the United States, residing at River Forest, Illinois, have invented new and useful Improvements in Automobile-Guards, of which the following is a specification.

This invention relates to an automobile guard, intended to prevent unauthorized operation of a motor car and to give an alarm when unauthorized operation is attempted.

Guarding devices of this kind are known wherein the ignition circuit for the engine, lock which controls the exhaust guard, so that the fuel supply may be shut off simultaneously with the closure of the exhaust path for the burnt gases.

Another object of the invention is to provide a lock controlling the various throttle and interrupting devices in the footboard of the car, to render the same inaccessible without actually boarding the vehicle, and to protect the lock against the entrance of dirt, dust, and the like.

With these and other objects in view, several embodiments of the invention are de-

10, disposed underneath the driver's seat, is connected by means of a pipe 11 with a carbureter 12, diagrammatically indicated in Fig. 1, and from this carbureter the fuel may be introduced by suitable devices and in proper timely relation to the various cylinders of the engine.

An exhaust guard 13 is inserted into the exhaust conduit 2, preferably in that portion of said conduit which passes underneath the footboard 14 at the driver's seat. As may be seen in Fig. 2, this guarding device comprises a casting having flanges 15 which are connected with suitable flanges 16 of portions of the exhaust conduit by a plurality of fastening means shown as bolts 17. Gasket rings may be inserted between the flanges 15 and 16 to prevent leakage of the burnt gases. The casting 13, communicating with the exhaust 2, is provided with a branch or by-pass 18, to which the gases passing through the conduit in the direction of the area shown in Fig. 2 may be admitted when a valve, 19, is placed in proper position. This valve, being shown in Fig. 2 as a wing valve, is mounted on a stem 20, which is pivotally located in the branch or by-pass 18 and which may be held normally in the position indicated in dotted lines in Fig. 2, whereby the gases may be passed through the unobstructed conduit 2 to the muffler. The passage of the gases through the by-pass 18 is furthermore obstructed by the provision of elements adapted to reduce the area of the passageway for the gases through said by-pass. In Fig. 2 a plate 21, preferably integral with the casting 13, is provided with a number of small apertures or slots 22 through which the gases must pass prior to their entrance into the branch 18 of the casting. The total area of these apertures 22 is considerably smaller than the area of the passageway for the gases in the conduit 2, whereby back pressure will be produced within the exhaust conduit 2 and within the cylinders connected with said conduit when the exhaust gases are compelled to escape through the said apertures 22. After having passed through said apertures, an escape of the gases into the atmosphere is possible only through narrow slots 23, and in the escape of the gases through these narrow slots an audible signal will be given, owing to the fact that the area through which the gases may escape is considerably reduced.

An exhaust guard 13 may also be provided with a tubular extension 24, projecting upwardly from the casting 13 when the parts are assembled and serving as a guiding means and support for the extension 25 on the valve stem or pivot 20. The upper portion of the tubular extension 25 is constructed as a lock barrel 26 adapted for coöperation with a companion lock member 27 in which tumblers 28 of ordinary well-known construction are retained by suitable means not shown in the drawing. This barrel also is provided with a keyhole 29 into which a key 30 may be introduced for releasing the tumblers from engagement with the barrel, whereby the latter and the valve may be rotated from one terminal position to another and may be held in either end position until it is released by the introduction of the key 30 and by the turning of said key. The operation of locks of this kind is well-known and does not require further description. The tumbler retaining member 27 may be constructed as a flange connected with the tubular extension 24 of the casting 13.

While in Fig. 3 the lock is shown in combination with the exhaust guard only, it is an object of the invention to combine with this exhaust guard and lock for the same, additional means for safeguarding the automobile against unauthorized operation, and for this purpose the lock may be combined with additional devices (as, for instance, shown in Figs. 1 and 4) interrupting an electrical circuit and the fuel supply when it is desired to lock the car. The extension 25' of the valve stem is guided and supported in a tubular projection 24', which may be integral with the exhaust guard or which may be connected with the same. The upper end of the extension 25' is again constructed as a lock barrel 26', the tumblers and retaining member not being shown in Fig. 4. An insulating plate 30', rigidly secured to the upper end of the barrel 26', carries on its under surface a semi-circular metallic plate 31, as shown in Fig. 7. The ends of this semi-circular plate 31 are adapted to make contact with pins 32 forming the terminal points of the conductor portions 9, which, as may be seen from Fig. 1, lead to the source of electric energy and to the distributing device respectively. In order to facilitate the attachment of the pins 32 to the conductor portions 9, metallic clips 33 may be fastened to the conductors by screws 34, which enter the under surface of the footboard 14. The upper parts of the clips 33 rest on the horizontal flange of a bushing 35 of insulating material which is placed on top of the lock member 27' and which surrounds the barrel 26'. It is obvious from the above that if a rotation of the barrel 26' and of the semi-circular plate 31 connected therewith takes place, the path of the current from one conductor 9 to the other conductor portion may either be interrupted or closed.

An arm 36, projecting laterally from the stem 25' and rigidly secured to the same (as, for instance, by threaded engagement), also extends through a suitable aperture 37 in the tubular support 24'. The free end of this arm is in pivotal connection with the free end of an arm 38, rigidly secured at its other end to the stem 39 of a valve plug or the like, indicated at 40, in the valve casing 41, which is inserted in the conduit 11 serving for the supply of the fuel to the engine. Upon the rotation of barrel 26' and extension 25' into locking position, the arm 36 also will be turned, and, owing to its pivotal connection with the arm 38, it will rotate the valve 40, so that said valve obstructs the passage of the fuel supply to the engine. When the barrel is released and turned into unlocking position, the fuel may again pass practically unobstructed to the engine.

In order to protect the barrel and the parts pertaining thereto against the entrance of dirt or other substances, the aperture in the footboard 14, in which the barrel is located, may be closed by a hinged cover 42, which can be swung into open position when it is desired to insert a key into the keyhole of the barrel for turning the same.

A modified embodiment of the exhaust guard, illustrating a different form of exhaust throttle and whistle, is shown in Fig. 5 and may be connected with the combination of parts as shown in Fig. 4. The exhaust guard of this embodiment comprises a casting 13' having a by-pass or branch 18', the entrance of the gases to the by-pass being normally prevented by a wing valve 19' when said valve is in the position indicated in Fig. 6. If this valve, however, is turned about its pivotal support (indicated at 45), the exhaust gases from the conduit 2 will be forced to enter the by-pass 18' through a throttling or reducing passage 46 formed between the annular projection 22 in the by-pass or branch 18' and a stem 47, projecting in direction of the flow of the gases through said by-pass. A cup 48 is rigidly secured to the lower end of the stem in such position that the upper edge of said cup is in opposition to the restricted passage 46. The exhaust gases therefore will be compelled to enter said cup 48; where, owing to the limited space for the same, a whirling, rapid motion will be imparted to said gases, and they will finally escape in a counter current flow through the open end of the by-pass 18. The reduction of the exhaust passage will not only produce back pressure in the engine, thereby preventing the normal operation of the same; but it will also result in a noisy signal, in the form of a whistling sound, being produced by the escape of the gases through said passage.

The operation of the device is apparent from the specification given above. When it is desired to lock the car against operation, the normal exhaust conduit for the burnt gases is obstructed by the rotation of the valve 19 or 19' into a position in which the gases will be forced through the by-pass 18 or 18' respectively. The valve is maintained in said position by the lock 25 or 25', and it is necessary for the operation of the car to turn said lock into a position in which the valve 19 or 19' will freeze the exhaust conduit. The valve will remain locked in said open position until the lock is operated again to place the valve into the first named position. The throttling of the exhaust gases will not only produce the back pressure in the engine as stated and prevent thereby the car from assuming its normal speed, but it will also result in the production of an exhaust noise which is so different from the noise ordinarily accompanying the exhaust of gas engines that the engine cannot be operated without calling everybody's attention to the fact that an attempt is made to run this car without authorization. It is also obvious that it is more difficult to render this guard inoperative without operation of the lock than any of the other guards known. The elements preventing the normal operation and giving the audible signal are inclosed in a casting which is rigidly connected with another relatively heavy casting of the engine, and only by breaking up this rigid connection or by breaking these castings would it be possible to eliminate the guard.

While only two different embodiments of the signal device operated by the exhaust gases are shown and described, it is also obvious that many other signal devices may be used for the same purpose and in the exhaust conduit, and may produce an audible signal which can be noticed, owing to its intensity, over a far larger area than electric alarm bells and other similar signal devices.

I claim:

1. In an automobile, the combination of an engine, a foot board, an exhaust conduit extending from the engine underneath said foot board, a device for throttling the exhaust gases inserted in said conduit underneath said foot board, and a lock in the foot board for placing and holding said throttling device in operative or inoperative position.

2. In an automobile, the combination of an engine, an exhaust conduit connected with the engine, and extending underneath the foot board, an alarm device operatable by the exhaust gases disposed in said conduit underneath the foot board, and a lock operated in said foot board, placing said alarm device in operative or in inoperative position respectively.

3. A safety device for automobiles, including in combination with the exhaust of the automobile engine, a movable element adapted to create back pressure when moved in a predetermined position, and means for locking said back pressure element in said position.

4. In a safety device for automobiles, in combination with the exhaust conduit of the automobile engine, an element within said conduit adapted to create back pressure in the engine when placed in a predetermined position, a signal device associated with said element and becoming operative when said element is moved in said predetermined position, and means for locking said element in said position.

5. In a safety device for automobiles, the combination with the exhaust conduit of the automobile engine, of a lockable back pressure creating device combined with an alarm device, an ignition circuit, and a switch for the same, the lock for said back pressure and alarm device being operatively connected with the ignition circuit switch.

6. A safety device for automobiles, including in combination with the exhaust of the automobile engine, a back pressure creating device in said exhaust, an alarm device associated with said back pressure creating device, a lock for said back pressure device, a fuel supply conduit, a valve in said conduit, and means connecting said valve with said lock, whereby upon placing said back pressure creating device into operative position the fuel supply is shut off automatically from the engine.

7. A safety device for automobiles, including in combination with the exhaust of the automobile engine, a back pressure creating device, an alarm signal device associated therewith, a lock for maintaining said back pressure creating device in operative position, an ignition circuit, a switch for the same, a fuel supply conduit, a valve in said conduit, and means for permanently connecting the lock for the back pressure device with the valve and the ignition circuit switch, whereby upon placing said lock in operative position the fuel supply is automatically interrupted and the ignition circuit is automatically opened.

In testimony whereof I affix my signature.

GEORGE T. BURRELL.